United States Patent [19]
Osada et al.

[11] Patent Number: 4,660,209
[45] Date of Patent: Apr. 21, 1987

[54] HIGH SPEED AXIAL FLOW TYPE GAS LASER OSCILLATOR

[75] Inventors: Hidenori Osada, Hacienda Heights; Ryoji Koseki, Redondo Beach, both of Calif.

[73] Assignee: Amada Engineering & Service Co., Inc., La Mirada, Calif.

[21] Appl. No.: 891,413

[22] Filed: Aug. 1, 1986

Related U.S. Application Data

[63] Continuation of Ser. No. 566,793, Dec. 29, 1983.

[51] Int. Cl.$^4$ .............................................. H01S 3/22
[52] U.S. Cl. ...................................... 372/58; 372/34; 372/61; 372/65; 372/93
[58] Field of Search ...................... 372/58, 59, 61, 55, 372/93, 107, 34, 65

[56] References Cited

U.S. PATENT DOCUMENTS

| 4,287,487 | 9/1981 | Kuwabara et al. | 372/59 |
| 4,468,777 | 8/1984 | Takemoni et al. | 372/107 |

FOREIGN PATENT DOCUMENTS

| 0162287 | 12/1980 | Japan | 372/55 |
| 0019691 | 2/1981 | Japan | 372/59 |
| 0051885 | 5/1981 | Japan | 372/65 |
| 0087392 | 7/1981 | Japan | 372/55 |
| 1256398 | 12/1971 | United Kingdom | 372/59 |

Primary Examiner—Leon Scott, Jr.
Attorney, Agent, or Firm—Wigman & Cohen

[57] ABSTRACT

A high-speed axial flow gas laser oscillator has plurality of laser tubes arranged parallel to and interconnected with one another to form a plurality of parallel, straight length sections for resonating and amplifying a laser gas, electrode means associated with the laser tubes for ionizing and thereby incidently heating a laser gas circulated therethrough, means for circulating the laser gas through the laser oscillator, and heat exchanger means for cooling the laser gas circulated through the laser oscillator. A plurality of gas recirculation paths are positioned on opposite sides of the laser gas circulating means and are disposed symmetrically with respect to the laser gas circulating means and the parallel, straight length sections formed by the laser tubes. Means are disposed in each of the recirculation paths between the laser tubes and the gas recirculation means so as to be symmetrical with respect to the laser tubes and the gas recirculation means for deionizing the laser gas so that the heated laser gas may be recirculated through the heat exchanger and into the laser tubes in an electrically neutral state whereby the flow rates of the laser gas flowing through the laser tubes and the length of the gas recirculation paths are substantially equal, thereby maintaining a temperature increase in each of the laser tubes substantially equal.

5 Claims, 8 Drawing Figures

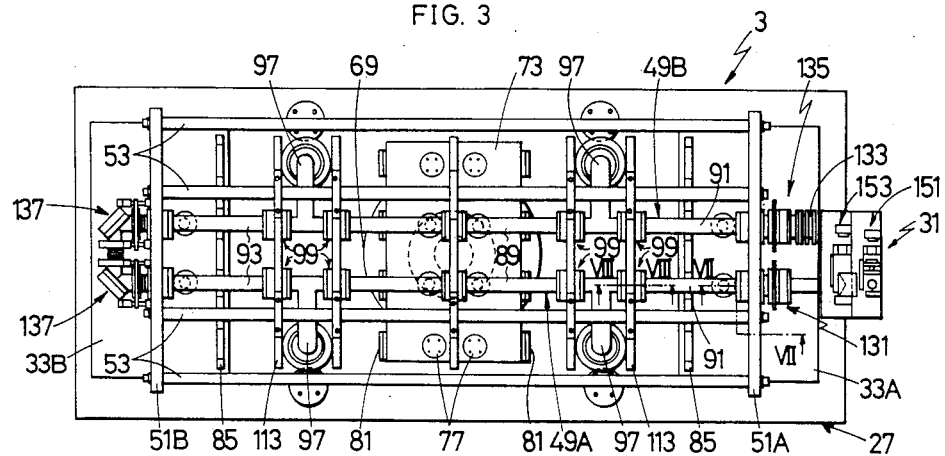
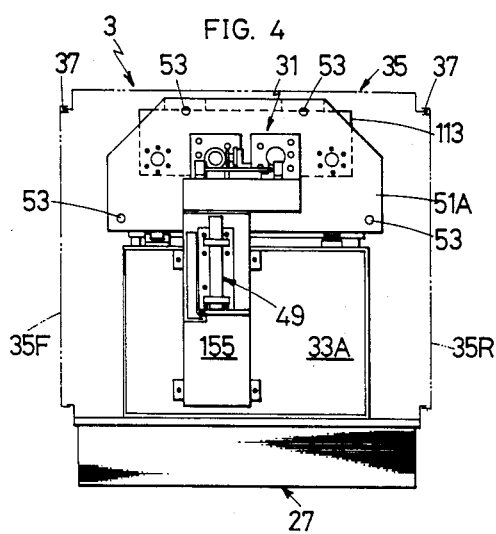
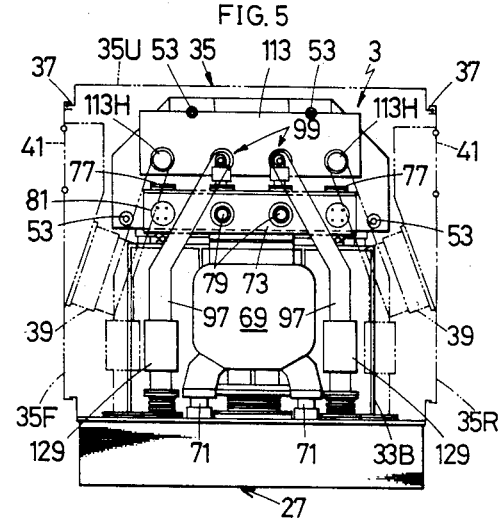

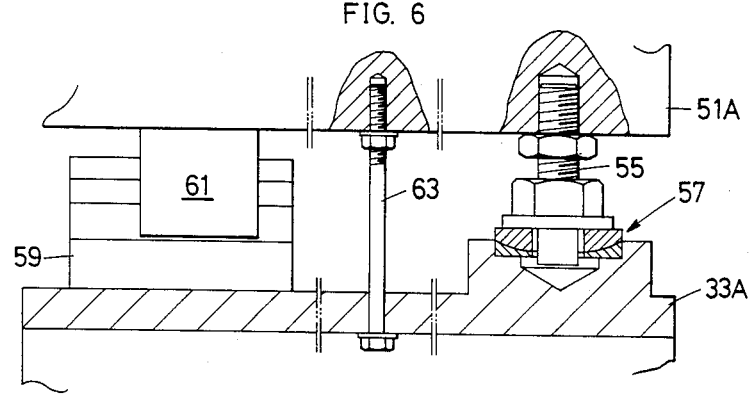
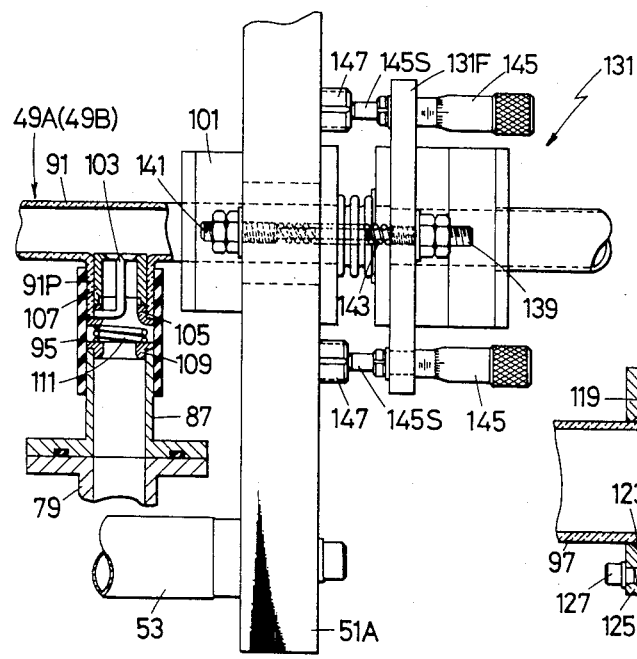
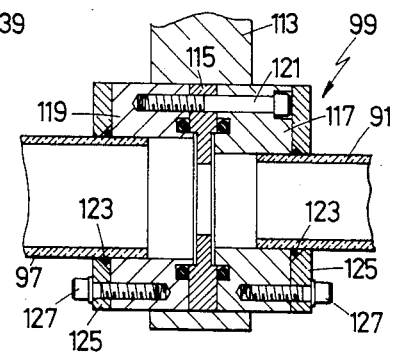

HIGH SPEED AXIAL FLOW TYPE GAS LASER OSCILLATOR

This is a continuation of co-pending application Ser. No. 566,793, filed on Dec. 29, 1983.

BACKGROUND OF THE INVENTION

1. Field of the Invention

This invention relates to gas laser oscillators. More specifically, it relates to high-speed axial flow type gas laser oscillators in which the laser gas flows in the direction of the laser beam.

2. Description of the Prior Art

In a gas laser oscillator, the laser amplification effect occurs inside a laser tube where a plasma is produced. It is known that increasing the length of a laser tube results in an increase in output because it increases the volume occupied by plasma. Consequently, to increase the laser output, the laser tubes of a gas laser oscillator should be increased in length. However, increasing the length of the laser tubes poses problems both technologically and in terms of the amount of space required. Therefore, in general, a plurality of laser tubes are arranged parallel to each other and reflecting mirrors are placed at the connections between tubes, thus increasing the effective overall length. In addition, it is known that in a gas laser oscillator, by cooling the laser gas the population inversion is accelerated and the laser oscillation efficiency is increased. Consequently, in general the laser tubes are cooled, or else the laser gas is cooled in a heat exchanger and then injected into the laser tubes at high speed: The laser gas heated by the electric discharge is immediately recirculated back to the heat exchanger where it is cooled again. In addition, to improve efficiency in a gas laser oscillator it is also necessary to improve the efficiency of use of the electric power used for injection.

Conventional high-speed axial flow type gas laser oscillators have a cooler or heat exchanger to cool the laser gas in the laser tubes and a blower to inject the gas into the tubes at high speed, and then the gas is recirculated from the laser tubes to the heat exchanger. However, the lengths of the recirculation paths from the laser tubes to the heat exchanger or cooler are not constant in the prior art gas laser oscillators. This means that the resistances to gas flow in the different recirculation paths are not equal, which produces inequalities in the flow rates and thus in the temperature of the laser gas within the different laser tubes.

That is to say, in the tubes which receive laser gas which has circulated at lower flow rates than the laser gas entering other laser tubes, the temperature is higher, meaning that the population inversion is reduced and, in turn, the laser output is reduced, and this in turn affects the mode of the laser beam. Consequently, the different flow rates of the laser gas entering different laser tubes is a cause of lower output and fluctuations in output from the entire gas laser oscillator.

In addition, the gas which is recirculated to the heat exchanger from the laser tubes in a gas laser oscillator is a kind of plasma because the gas has been ionized by electrical discharges inside the laser tubes. This in turn means that the gas becomes electrically conducting, so that wasteful electrical discharges, which do not contribute anything to the pumping of the laser gas, occur between the heat exchanger and the cathodes of the laser tubes, producing a large loss of electrical power used for injection. In addition, these electrical discharges heat the laser gas further, imposing an additional load on the heat exchanger or cooler.

Also, in the prior art gas laser oscillators, there is a troublesome problem in removing and replacing electrodes. For stability of the electrical discharges and good condition of the flow of the laser gas inside the laser tubes, it is required that the electrodes be ring-shaped. Also, to reduce the contact resistance between the electrodes and the electrode holders, the electrodes are shrink fitted to the electrode holders which are coupled to the laser tubes. Consequently, since each electrode holder must be removed from the laser tube in order to replace the electrode, the problem that the laser tube must be displaced in the axial direction arises.

In addition, in the prior art gas laser oscillators, since the support plates which support the laser tubes are fixed to the base, there is the problem that it is difficult to compensate for the heat deformation of the support plates and surrounding parts.

SUMMARY OF THE INVENTION

The primary object of this invention is to provide a high-speed axial flow type gas laser oscillator in which the flow rates of the laser gas inside the laser tubes will be more or less equal.

Another object of this invention is to provide a high-speed axial flow type gas laser oscillator in which the lengths of the recirculation paths from the laser tubes to the heat exchanger or cooler will remain approximately equal even if the number of tubes is increased or decreased.

Another object of this invention is to provide a high-speed axial flow type laser oscillator in which the electrical discharges between the electrodes of the laser tubes and the heat exchanger are suppressed, reducing the loss of electric power used for injection and suppressing excessive heating of the laser gas, and, in addition, reducing the additional load on the heat exchanger or cooler.

Another object of this invention is to provide a high-speed axial flow type laser oscillator in which the removal and replacement of the electrodes in the laser tubes can be carried out easily without displacing the tubes in the axial direction.

Another object of this invention is to provide a high-speed axial flow type gas laser oscillator in which the vibrations in the blower which is used to circulate laser gas to the laser tubes are not transmitted to each of the tubes, and, moreover, it is possible to compensate for thermal deformation in the connections between the blower and the laser tubes.

Still another object of this invention is to provide a high-speed axial flow type gas laser oscillator in which the support plates which support both ends of the laser tubes are able to move slightly to compensate for expansion and contraction of the tie rods which are coupled to each support plate.

In order to achieve these and other objects, in the oscillator according to this invention the lengths of the gas recirculation paths from the laser tubes to the heat exchanger or cooler are approximately equal. In addition, along the recirculation paths there is a catalyst to neutralize the ionized laser gases. In addition, the connections between the blower and each laser tube and between each laser tube and the heat exchanger employ joints made of flexible material. In addition, the support plates of the laser tubes are mounted in such a way that they are free to move slightly in response to expansion and contraction of the tie rods. In addition, the electrodes inside each laser tube are clamped between prongs of a holder in such a way that they can easily be removed and replaced.

Other and further objects and advantages of the present invention will be apparent from the following description and accompanying drawings which, by way of illustration, show a preferred embodiment of the present invention and the principle thereof.

BRIEF DESCRIPTION OF THE DRAWINGS

FIG. 3 shows a top plan view of the laser oscillator of FIG. 2.

FIG. 4 shows a right side elevational view of the laser oscillator of FIG. 2.

FIG. 5 shows a cross-sectional diagram along the line V—V of FIG. 2.

FIG. 6 shows an enlarged cross-sectional diagram along the line VI—VI of FIG. 2.

FIG. 7 shows an enlarged cross-sectional diagram along the line VII—VII of FIG. 3.

FIG. 8 shows an enlarged cross-sectional diagram along the line VIII—VIII of FIG. 3.

DESCRIPTION OF THE PREFERRED EMBODIMENTS

Figure 1:
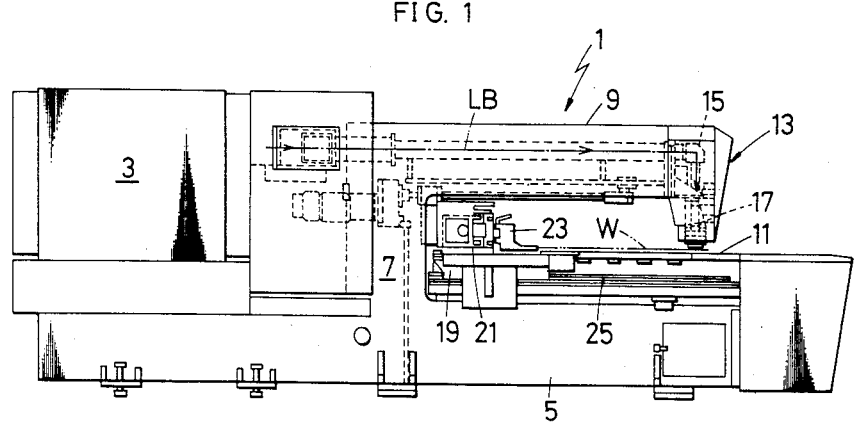
FIG. 1 shows a front elevational view of a laser machine tool which incorporates a laser oscillator based on this invention.

Referring to FIG. 1, the numeral 1 generally designates a conventional laser machine tool which incorporates a laser oscillator 3. This laser oscillator 3 generates a laser beam LB in the direction toward the laser machine tool 1 and is mounted on the rear of the laser machine tool 1. Also, in FIG. 1, the laser oscillator 3 is mounted on the laser machine tool 1, but the laser oscillator 3 is not used only with laser machine tools; it can also be used in other types of devices.

The laser machine tool 1 consists of a base 5, a post 7 which rises perpendicularly from the base 5, and an overhead beam 9 which is provided above and parallel to the base 5 and is supported on one end in a cantilever manner by the post 7. Disposed on the base 5 is a work table 11 on which a large number of sliding balls are rotatably positioned to support a sheet work piece W to be machined in a horizontal position. A machining head assembly body 13 is mounted on the free end of the above-mentioned overhead beam 9; a mirror assembly 15 and a light focusing lens 17 are built into this machining head assembly body 13. The above-mentioned mirror assembly 15 reflects laser beam LB generated by the laser oscillator 3 in the direction of work piece W. The light focusing lens 17 concentrates the light of laser beam LB and is mounted in such a position that it aims laser beam LB at the work piece W together with an assisting gas such as oxygen. Consequently, the laser machine tool 1, which is constructed as described above, receives laser beam LB from the laser oscillator 3 and is constructed so that it aims the laser beam LB at the work piece W through the light focusing lens 17 which is mounted inside the machining head assembly body 13.

In order to move the workpiece W to be machined and to set it in the correct position, the laser machine tool 1 has a first carriage 19 which is free to move horizontally and a second carriage 21 which has a plurality of clamping devices 23 which clamp the work piece W in position. The first carriage 19 is supported in such a way that it is free to move by a pair of rails 25 which are mounted parallel to each other on the upper part of the base 5, and is free to move toward and away from the area where machining is being done, directly below the machining head assembly body 13, when driven by power. The second carriage 21 which has the clamping devices 23 is supported so that it is free to slide on top of the first carriage 19; it is free to move horizontally when driven in a direction perpendicular to the above-mentioned rails 25. Consequently the workpiece W which is clamped in place by the clamping devices 23 is moved on top of the work table 12 by the motion of the first carriage 19 and the second carriage 21 to a position directly below the machining head assembly body 23.

In the above-described configuration, by positioning the workpiece W immediately below the machining head assembly body 13 on top of the work table 11 by means of the motion of the first carriage 19 and the second carriage 21, the workpiece W is machined by the laser beam LB. Of course, the laser beam LB, which is generated by the laser oscillator 3, is directed at the machining head assembly body 13 and directed downward as shown by the arrow by the mirror assembly 15. Then, after the light is concentrated by the light focusing lens 17, it is directed at the workpiece W together with an assisting gas such as oxygen.

Now referring to FIGS. 2 through 5, the above-mentioned laser oscillator 3 comprises a support trestle 27 which supports the whole oscillator, a laser oscillation or lasing section 29 which is supported on top of the support trestle 27, an adjustment attachment section 31 which is used for adjustment of the optical system of the above-mentioned laser machine tool 1 and for adjustment of the mirrors in the laser oscillation section 29. That is to say, the above-mentioned support trestle 27 is constructed of a plurality of square pipes in a rectangular shape; box-shaped support platforms 33A and 33B, which stand on the right and left sides of this support trestle 27, in turn support the above-mentioned laser oscillation section 29. The above-mentioned adjustment attachment section 31 may be mounted on the support platform 33A, on the output side of the laser oscillation section 29.

As clearly understood in FIG. 5, in order to protect the whole laser oscillator 3, a protective cover 35, which covers all of the laser oscillation section 29, the adjustment attachment section 31, etc., is set up on the above-mentioned support trestle 27. A front cover 35F and a rear cover 35R of the protective cover 35 are attached to an upper cover 35U through a hinge 37 for closing and opening so that supervision and maintenance of the above-mentioned laser oscillation section 29, adjustment attachment section 31, etc. can be carried out easily. Also, in order to cool the inside of protective cover 35, auxiliary heat exchangers 39 with ventilation fans are mounted at a plurality of locations on the above-mentioned front cover 35F and rear cover 35R, and, in addition, transparent windows 41 with acryl panes are installed at suitable locations. Consequently, the air inside the protective cover 35 is always cooled and circulated by the auxiliary heat exchangers 39, and, in addition, the interior can be observed through the transparent windows 41.

Figure 2:
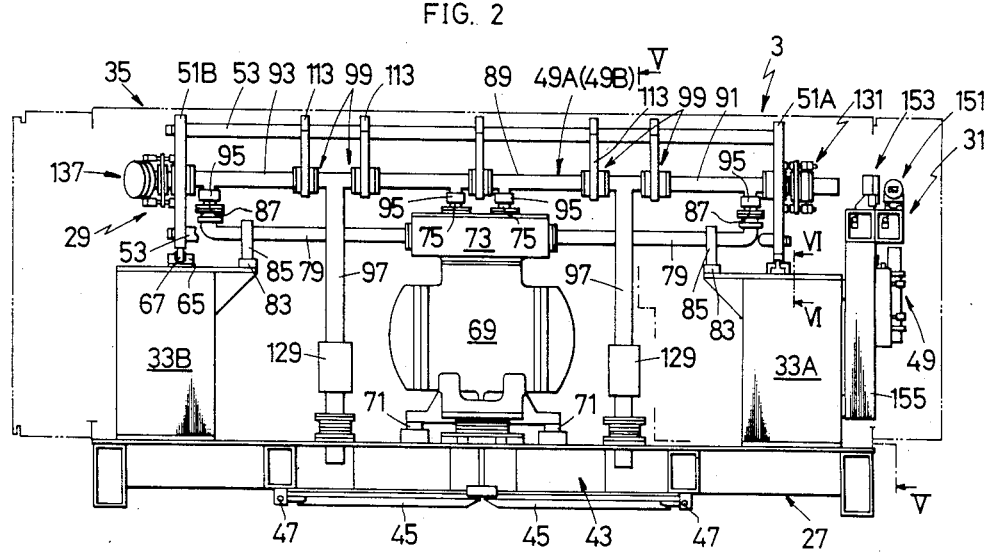
FIG. 2 shows a front elevational view of a laser oscillator based on this invention.

As illustrated in FIG. 2, in order to cool the laser gas, which is a mixture of He, $N_2$ and $CO_2$ and which is circulated from the above-mentioned laser oscillation section 29, a relatively large main heat exchanger 43 is installed in the central part of the above-mentioned support trestle 27. This main heat exchanger 43 has bent pipes through which a coolant such as cooling water flows in and also has a large number of cooling fins, etc. In order to make it easy to maintain the above-mentioned heat exchanger 43, a base plate 45 in the main heat exchanger 43 is attached to the support trestle 27 through a hinge pin 47 in such a way that it can open and close in the downward direction. Consequently, maintenance and supervision of the main heat exchanger 43 are easy to carry out.

The above-mentioned laser oscillation section 29 has a plurality of laser tubes 49A and 49B, arranged parallel to each other, where the excitation light resonates and is amplified. The laser tubes 49A and 49B extend out to the right and left; their ends are supported by vertical support plates 51A and 51B which are supported by the above-mentioned support platforms 33A and 33B. The above-mentioned support plates 51A and 51B extend in the forward and rear directions, perpendicular to the direction in which the laser tubes 49A and 49B extend; the support plates 51A and 51B are joined in a single unit by a number of tie rods 53 which are installed above and below the support plates 51A and 51B.

In order to respond to thermal deformation of the support plates 51A and 51B, the tie rods 53, etc. caused by variations of the temperature inside the above-mentioned protective cover 35, the support plates 51A and 51B are mounted in such a way that they can move slightly with respect to the support platforms 33A and 33B. That is to say, as is shown best in FIG. 6, threadably connected near one end of the support plate 51A is a depending adjustment screw 55 which is connected to the supporting platform 33A through a spherical surface seat means 57 which permits it to rotate and tilt slightly. Also, near the other end of the support plate 51A, the support plate 51A is connected to the supporting platform 33A through a guide 59 and a sliding block 61 so as to accomodate the thermal expansion of the support plate 51A along the longitudinal direction thereof. Finally, near the middle of the support plate 51A, the support plate 51A is connected to the supporting platform 33A through a thin flexible stud bolt 63. The other support plate 51B is connected to the supporting platform 33B through a fixed guide 65 and a sliding block 67, as shown in FIG. 2, so that the support plate 51B can slide along the supporting platform 33B in the left-right direction.

With the above-described configuration, if the tie rods 53 are thermally deformed in the longitudinal direction, the support plate 51B can take up that motion by moving slightly in the same direction, while thermal deformation of the support plate 51A in the longitudinal direction, slight rotation of the whole unit, etc. are taken up by motion along the spherical swivel surface 57, guide 59, etc. Consequently, the support plates 51A and 51B which support both ends of laser tubes 49A and 49B remain in their accurate positions without great change caused by thermal deformation.

Referring again to FIGS. 2 through 5, in order to supply laser gas to the insides of the laser tubes 49A and 49B, the laser tubes 49A and 49B are connected to a gas circulation drive device 69, and, in addition, in order to cool the laser gas which is heated by electrical discharges inside the laser tubes 49A and 49B, the laser tubes 49A and 49B are connected to the above-mentioned main heat exchanger 43. That is to say, the gas circulation drive device 69 receives laser gas that has been cooled inside the main heat exchanger 43 and supplies it to the laser tubes 49A and 49B. For example, the driving can be done by a Root's blower, etc. The drive device 69 is supported on top of the main heat exchanger 43 through a plurality of vibration-absorbing pieces of rubber 71.

On the upperpart of the above-mentioned gas circulation drive device 69, there is an auxiliary heat exchanger 73 to remove the heat produced by the gas circulation drive device 69 and to insure adequate cooling of the laser gas supplied to the laser tubes 49A and 49B. The auxiliary heat exchanger 73 might for example be a heat exchanger that uses cooling water, in which case it would be box-shaped. A plurality of connecting pipes 75 are mounted vertically on its top surface, and there are additional holes plugged by circular covers 77 to accomodate additional laser tubes. In addition, the bases of connecting pipes 79 are connected horizontally to both side surfaces of the auxiliary heat exchanger 73, and there are additional holes plugged by covers 81 so that additional laser tubes can be accommodated. The other ends of the above-mentioned connecting pipes 79 extend to near both ends of the laser tubes 49A and 49B where they are supported, through vibration-absorbing pieces of rubber 83, by supporting blocks 85 which are mounted on the above-mentioned supporting platforms 33A and 33B. Consequently, the vibrations of the gas circulation drive device 69 are not transmitted to the support trestle 27 or to the supporting platforms 33A and 33B.

In order to supply the laser gas which is ejected from the above-mentioned gas circulation drive device 69 to the laser tubes 49A and 49B, the above-mentioned connecting pipes 75 are connected to the laser tubes 49A and 49B near the centers thereof. The tips of connecting pipes 79 are connected to both ends of the laser tubes 49A and 49B through vertically mounted connecting pipes 87. To describe this in greater detail, the above-mentioned laser tubes 49A and 49B can be divided into three parts, central tubes 89 and end tubes 91 and 93. The connecting pipes 75 are connected to the central tubes 89, and the connecting pipes 79 are connected to the end pipes 91 and 93, through joints 95 which are made of circular pieces of flexible silicon rubber. Consequently, the vibrations of the gas circulation drive device 69 are not transmitted to the laser tubes 49A and 49B, and small shifts in any direction in the relative positions of the connecting pipes 75 and 87 and the laser tubes 49A and 49B are taken up by the flexible joints.

In order to produce electrical discharges in laser tubes 49A and 49B, pairs of positive and negative electrodes are mounted at a plurality of locations in the laser tubes 49A and 49B. In order to cool the laser gas that is heated by the electrical discharges in the laser tubes 49A and 49B, the laser tubes 49A and 49B are connected to the above-mentioned heat exchanger 43. That is to say, in the above-mentioned joints 95, anodes are imbedded, as will be explained below. Disposed between the central tubes 89 and the end tubes 91 and 93 of the laser tubes 49A and 49B are gas recirculation paths 97, of which the upper ends are T-shaped and the lower ends are connected to the main heat exchanger 43 through bellows, and which are connected to the central tubes 89 and the end tubes 91 and 93 through electrode assemblies 99. Consequently, the laser gas that is supplied from the gas circulation drive device 69 through the auxiliary heat exchangers 73 to the laser tubes 49A and 49B flows back to the main heat exchanger 43 through the gas recirculation paths 97, and, after being cooled in the main heat exchanger 43, is fed to the gas circulation drive device 69, cooled further by the auxiliary heat exchangers 73 and then supplied again to the laser tubes 49A and 49B.

Referring to FIG. 7, the ends of the end tubes 91 of the laser tubes 49A and 49B are supported by the support plate 51A through cylindrical end holders 101. Near the ends there are cylindrical protrusions 91P that protrude in the downward direction. The above-mentioned joints 95 are coupled to these protrusions 91P. Cylindrical anode holders 105 which contain needle-shaped anodes 103 are inserted into the interior of these protrusions 91P. Electrically insulating protective tubes 107 which surround the anodes 103 are screwed into the anode holders 105. The top ends of the anodes 103 are up against the top ends of the protective tubes 107. There are annular spring washers 109 inserted above the top ends of the connecting tubes 87 which are inserted into the joints 95 from below, in such a way that the springs are compressed from the opposite ends thereof by the protrusions 91P and the connecting tubes 87 inside the joints 95. Electrically conducting coils 111 are resiliently mounted between these spring washers 109 and anode holders 105.

The configuration described above permits relative displacements between the end tube 91 and the connecting tube 87 to be taken up and prevents the vibrations of the gas circulation driving device 69 from being transmitted to the laser tubes 49A and 49B.

The end tubes 93 of the laser tubes 49A and 49B are supported by the support plate 51B in the same manner as the end tubes 91. In addition, since the structure of the connections of joints 95 is the same as the structure described above, the detailed explanation is omitted here.

As is clear by referring again to FIGS. 2 through 5, the above-mentioned cathode assemblies 99 are supported by holder plates 113 which are supported by the tie rods 53 which connect the left and right support plates 51A and 51B together. There are a plurality of support holes 113H in the holder plate 113 to accomodate an increase in the number of laser tubes, and the minimum necessary number of cathode assemblies 99 are inserted into the support holes 113H.

As is shown best in FIG. 8, the cathode assemblies 99 are constructed so as to make it very easy to remove and replace ring-shaped cathodes 115. That is to say, on both sides of each cathode 115 there are two holder rings, a first holder ring 117, into which the end tubes 91 of the laser tubes 49A and 49B are inserted, and a second holder ring 119, into which the top end of the gas recirculation path 97 is inserted. The cathode 115 and both holder rings 117 and 119 are bolted together tightly by a plurality of bolts 121 so as to reduce contact resistance. Also, seal rings 125 which hold 0 rings 123 are bolted to the sides of both holder rings 117 and 119 by the bolts 127. Consequently, removal and replacement of the cathode 115 can be carried out easily by removing the bolts 127 and 121.

As has already been made clear, inside the laser tubes 49A and 49B there are a plurality of locations where electrical discharges are produced by pairs of the anodes 103 and cathodes 115. The laser gas which is heated by the electrical discharges inside the laser tubes 49A and 49B is recirculated through the above-mentioned gas recirculation paths 97 to the main heat exchanger 43. The lengths of the gas recirculation paths 97 are approximately equal so that the flow rate of the laser gas in the laser tubes 49A and 49B will remain about the same even if the number of laser tubes is increased. In addition, to neutralize the laser gas that has been ionized by electrical discharges inside the laser tubes 49A and 49B, a suitable catalyst is placed along each gas recirculation path 97. That is to say, along each gas recirculation path 97 there is an expanded part 129, and within this expanded part 129 there is a honeycomb-shaped activated alumina catalyst which might, for example, bear platinum.

In the configuration described above, the catalyst in each of the gas recirculation paths 97 is heated by the laser gas, which increases the effectiveness of the catalyst. The laser gas which passes through the expanded parts of the gas recirculation paths 97 containing catalyst is neutralized by the action of the catalyst and then flows back to the main heat exchanger 43 as a neutral gas. Consequently, wasteful electrical discharges which would otherwise tend to occur between the cathodes 115 and the main heat exchanger 43 are suppressed, increasing the overall efficiency of the oscillator.

In order to produce resonance and amplification of the light produced by electrical discharges inside the above-mentioned laser tubes 49A and 49B, an output mirror assembly 131 and a rear mirror assembly 135 are provided such that the output mirror assembly 131 which has an output mirror therein is mounted on one end of the laser tube 49A, while the rear mirror assembly 135 containing a suitable output detection sensor 133 and having a reflecting mirror therein is mounted on the same end of the laser tube 49B. Provided at the other ends of the laser tubes 49A and 49B are opposed bend mirror assemblies 137 which bend the excitation light paths 90 degrees. The output mirror assembly 131 and rear mirror assembly 135 are mounted on the support plate 51A through bellows so that their orientation can be adjusted freely, while each bending mirror assembly 137 is mounted on the support plate 51B through a bellows so that its orientation can be adjusted freely, and the two bending mirror assemblies are connected to each other through a bellows.

Referring again to FIG. 7, in order to control the orientation of the output mirror assembly 131, a suitable flange 131F is mounted on the mirror assembly 131. There are a plurality of adjustment screws 139 extending through this flange 131F and also a plurality of adjustment screws 141 extending through the support plate 51A, and there are tension springs 143 stretched between each pair of the adjustment screws. In addition, micrometers 145 are mounted at a plurality of locations on the above-mentioned flange 131; each spindle 145S of each micrometer 145 butts up against a block 147 which is screwed to the support plate 51A.

Consequently, since the output mirror assembly 131 is always biased toward the support plate 51A by the tension springs 143 with each spindle 145S of each of the micrometers 145 abutted against the block 147, by adjusting each micrometer 145 to an appropriate position, the orientation of output mirror assembly 131 can be adjusted, and fine adjustment of the angle of the mirror mounted inside is also possible.

The above-mentioned rear mirror assembly 135 and bending mirror assemblies 137 are mounted on the support plates 51A and 51B, respectively, in configurations indentical to that of the output mirror assembly 131.

The mounting positions are interchangeable so that if the number of laser tubes is increased the positions where the mirror assemblies are mounted can be changed freely as necessary to adjust to the increased number of laser tubes.

Referring again to FIGS. 2 to 4, the above-mentioned attachment section 31 consists of a helium-neon laser oscillator 149, a prism device 151, a beam damper 153, etc. The helium-neon laser oscillator 149 is used in the adjustment of the mirrors in the above-mentioned output mirror assembly 131, the rear mirror assembly 135 and the bending mirror assemblies 137 in the laser oscillating section 29, and in the adjustment of the optical system in the above-mentioned laser machine tool 1. As is clear from FIG. 2, the helium-neon laser oscillator 149 is vertically mounted on a support bracket 155 which is mounted on the supporting platform 33A. The prism device 151 serves to selectively refract the laser beam from the helium-neon laser oscillator 149 toward either of the laser tubes 49A and 49B in the above-mentioned laser oscillating section 29 or toward the laser machine tool 1. In the particular example shown here it is mounted movably with respect to the intersecting point of the laser beam from the helium-neon laser oscillator 149 with the laser beam LB from the laser oscillating section 29. The above-mentioned beam damper 153 can block the laser beam LB from the output mirror assembly 131 in the laser oscillating section 29; it is free to move in and out of the path of laser beam LB between the output mirror assembly 131 and the prism device 151.

As has become clear from the above explanation, in this invention, since the lengths of the recirculation paths from the several laser tubes which are arranged parallel to each other are approximately equal, the flow rates of the laser gas in each laser tube are about equal, and the temperature increase of the laser gas in each laser tube can be kept substantially the same. Consequently, stable laser output can be obtained.

Also, since each gas recirculation path contains a catalyst to neutralize the laser gas which has been ionized by electrical discharges, the laser gas which is recirculated to the main heat exchanger is neutral and high efficiency in input power is maintained without losses due to electrical discharges between the cathodes and the main heat exchanger.

In addition, in this invention, as was explained above the cathodes can be removed and replaced very easily, and the support plates and other supporting parts which support the laser tubes are free to move slightly to compensate for thermal expansion and contraction. In addition, the vibrations of blocks, etc. are not transmitted to the laser tubes so that high accuracy can be maintained.

Although a preferred form of the present invention has been illustrated and described, it should be understood that the device is capable of modification by one skilled in the art without departing from the principles of the invention. Accordingly, the scope of the invention is to be limited only by the claim appended hereto.

What is claimed is:

1. A high-speed axial flow gas laser oscillator comprising:
   a plurality of laser tubes arranged parallel to and interconnected with one another forming a plurality of parallel, straight length sections for resonating and amplifying a laser gas;
   electrode means associated with said laser tubes for ionizing and thereby incidentally heating a laser gas circulated therethrough;
   means for circulating said laser gas through said laser oscillator;
   heat exchanger means for cooling the laser gas circulated through said laser oscillator;
   means operatively connected between said laser tubes and said heat exchanger means defining a plurality of gas recirculation paths, said plurality of gas recirculation paths being positioned on opposite sides of said laser gas circulating means and disposed symetrically with respect to said laser gas circulating means and said parallel, straight length sections formed by said laser tubes; and
   means disposed in each of said recirculation paths between said laser tubes and said gas recirculating means so as to be symmetrical with respect to said laser tubes and said gas recirculation means for deionizing a laser gas so that said heated laser gas may be recirculated through said heat exchanger and into said laser tubes in an electrically neutral state whereby the flow rates of the laser gas flowing through the laser tubes and the length of the gas recirculation paths are substantially equal, thereby maintaining the temperature increase in each of said laser tubes substantially equal.

2. The gas laser oscillator of claim 1, wherein said deionizing means is a honeycomb-shaped, activated alumina catalyst.

3. The gas laser oscillator of claim 1, further including means for supporting said laser tubes, and wherein said means for supporting are adapted to move slightly to compensate for thermal expansion and contraction.

4. The gas laser oscillator of claim 3, wherein said means for supporting include a plurality of support plates each of which is mounted on one end in a spherical seat and on the other end in a guide having a block slidable therein.

5. The gas laser oscillator of claim 1, wherein said electrode means include cathodes arranged in rings around each of said laser tubes, and clamp means for removably securing said cathodes in place thereby facilitating easy removal and replacement thereof.

* * * * *